US006505816B1

(12) United States Patent
Hung

(10) Patent No.: US 6,505,816 B1
(45) Date of Patent: Jan. 14, 2003

(54) JACK WITH ROTARY HANDLE SLEEVE

(75) Inventor: Victor Hung, Lu Chu Hsiang (TW)

(73) Assignee: Shin Fu Corporation, Tao Yuan (TW)

( * ) Notice: Subject to any disclaimer, the term of this patent is extended or adjusted under 35 U.S.C. 154(b) by 0 days.

(21) Appl. No.: 09/954,076

(22) Filed: Sep. 18, 2001

(51) Int. Cl.7 .................................................. B60P 1/48

(52) U.S. Cl. ....................... 254/8 B; 254/8 R; 254/2 R; 254/DIG. 3

(58) Field of Search ...................... 254/DIG. 1, DIG. 3, 254/93 R, 93 H, 124, 2 B, 8 B, 8 R, 2 R

(56) References Cited

U.S. PATENT DOCUMENTS 3,817,546 A * 6/1974 Sugiura .................. 280/43.12
4,048,800 A * 9/1977 Cancilla ...................... 60/477
4,210,314 A * 7/1980 Carrol et al. ............... 254/8 B
4,277,048 A * 7/1981 Okuda ........................ 254/8 B
6,086,047 A * 7/2000 Lee ............................ 254/8 B

* cited by examiner

*Primary Examiner*—Joseph J. Hail, III
*Assistant Examiner*—Daniel Shanley
(74) *Attorney, Agent, or Firm*—Varndell & Varndell, PLLC

(57) ABSTRACT

A jack with a rotary handle sleeve is disclosed. The handle sleeve 4 of a jack is locked to a rotary supporting seat 3. The rotary supporting seat 3 passes through the pump 2 and washers to be locked to the base 1 of the jack. Thereby, handle sleeve 4 may rotate rightwards and leftwards. The oil return valve 10 is connected to a flexible shaft for controlling the opening and closing of the oil return valve 10. A steel ball bearing or a thrust bearing can be installed between the rotary supporting seat 3 or the base 1 of the jack so that the handle sleeve 4 may rotate freely. The handle sleeve 4 and the rotary supporting seat 3 have a design for confining the lower limit.

6 Claims, 8 Drawing Sheets

JACK WITH ROTARY HANDLE SLEEVE

BACKGROUND OF THE INVENTION (a) Field of the Invention

The present invention relates to a jack with a rotary handle sleeve. wherein the handle sleeve of the jack is locked to a rotary supporting seat, or a steel ball bearing or a thrust bearing is installed so that the handle sleeve can rotate leftwards or rightwards. The respective positions of the handle sleeve and the rotary supporting seat have designs for confining the lowest position.

(b) Description of the Prior Art

The prior art jack has a handle tube receiving a handle sleeve. Thereby, the tube can be moved up and down and the piston in the pump is driven to oil. However, the handle tube is confined so that it can only be moved up and down, but cannot be moved left and right. Generally, the four corners of the jack base are mounted with wheels for moving forwards and backwards, but the handle tube cannot rotate leftwards and rightwards. In the space below a car or in a narrow space, if it is desired to adjust the operation direction of the handle tube, movement of the handle tube is confined by the space so that the operation is very difficult. It is often that the top disk of the jack must be aligned to the supported portion of a heavy object, and then is moved to a correct position. This operation can be inconvenient with the prior art devices.

For example, U.S. Pat. No. 6,086,047 discloses a jack with a rotary handle tube, but the hydraulic cylinder and pump of that invention are installed on the upper end of the rotary supporting seat, and the central tube thereof moves upwards vertically. Therefore, the travelling path is very short. Besides, the distance between the rear wheels is too small. Thus, in using, it is possible that the jack is unstable and possibly become tilt.

SUMMARY OF THE INVENTION

Accordingly, the primary object of the present invention is to provide a jack with a rotary handle sleeve, wherein a handle sleeve of a jack is locked to a rotary supporting seat. The rotary supporting seat passes through the pump and washers to be locked to the base of the jack. Thereby, handle sleeve may rotate rightwards and leftwards.

Another object of the present invention is to provide a jack with a rotary handle sleeve, wherein the oil return valve is connected to a flexible shaft for controlling the opening and closing of the oil return valve. The handle sleeve and the rotary supporting seat have a design for confining the lower limit.

Another object of the present invention is to provide a jack with a rotary handle sleeve, wherein in the rotary supporting seat, a connected stopping piece is installed between the two supporting plates. Thereby, the handle sleeve is locked behind the rotary supporting seat. Therefore, by the connected stopping piece, the handle sleeve may have a stopping effect in the vertical direction so that the handle sleeve is preferably positioned in the vertically direction. Thereby, the movable roller is in contact with the piston without separating from one another.

Another object of the present invention is to provide a jack with a rotary handle sleeve, wherein predetermined positions of the handle sleeve and rotary supporting seat are installed with an extending stopper and a step-like stopping surface; after the handle sleeve presses downwards, the stopper resists against the stopping surface of the rotary supporting seat so as to be formed with a lower limit. As a result, the piston 21 of the pump is protected from damage due to an overlarge force.

A further object of the present invention is to provide a jack with a rotary handle sleeve, wherein a steel ball bearing or a thrust bearing can be installed between the rotary supporting seat or the base of the jack so that the rotation of the handle sleeve may rotate freely. Thereby, the movable roller is in contact with the piston without separating from one another.

The various objects and advantages of the present invention will be more readily understood from the following detailed description when read in conjunction with the appended drawing.

DETAILED DESCRIPTION OF THE PREFERRED EMBODIMENTS

Figure 1:
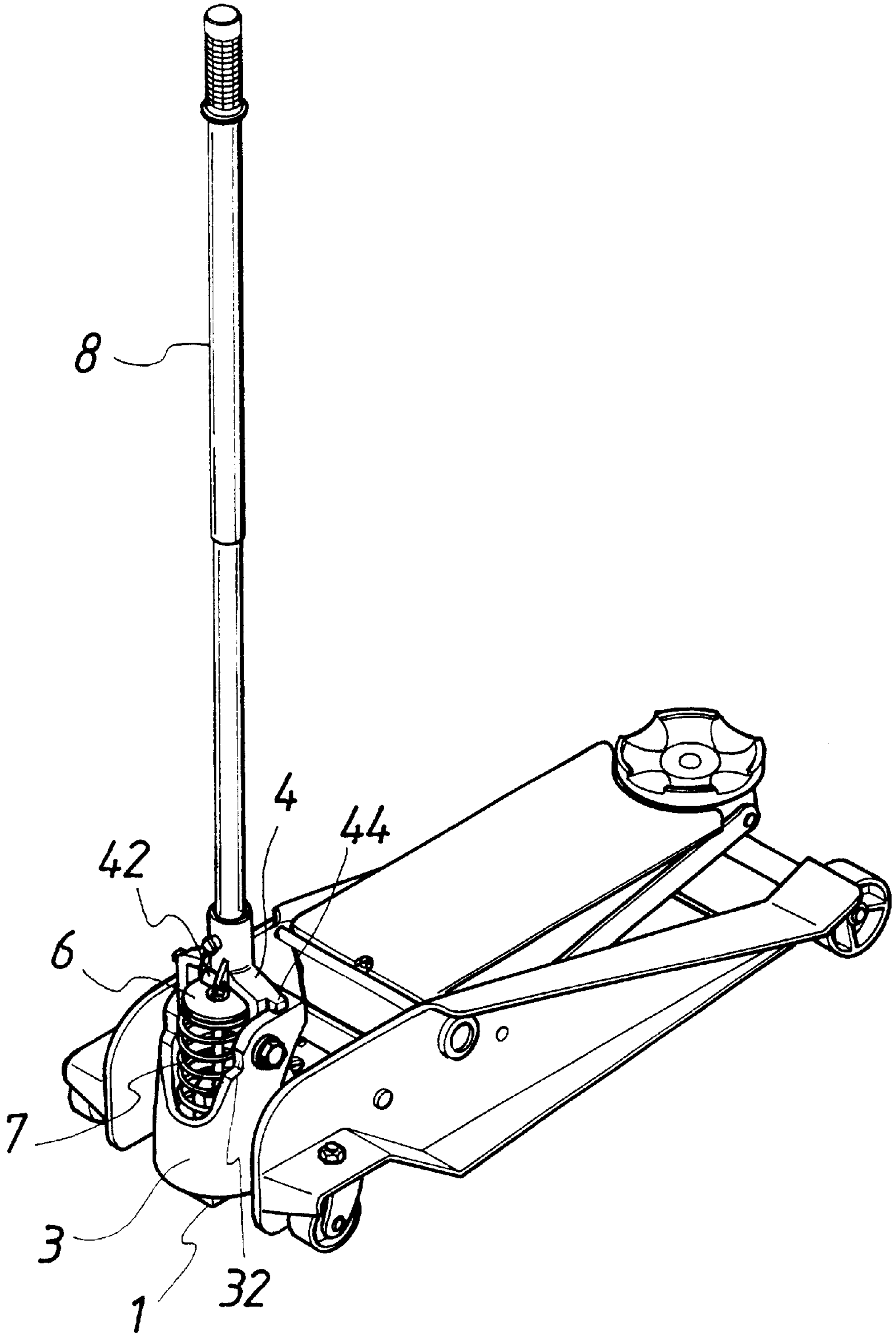
FIG. 1 is an assembled perspective view of the first embodiment of the present invention.
Figure 2:
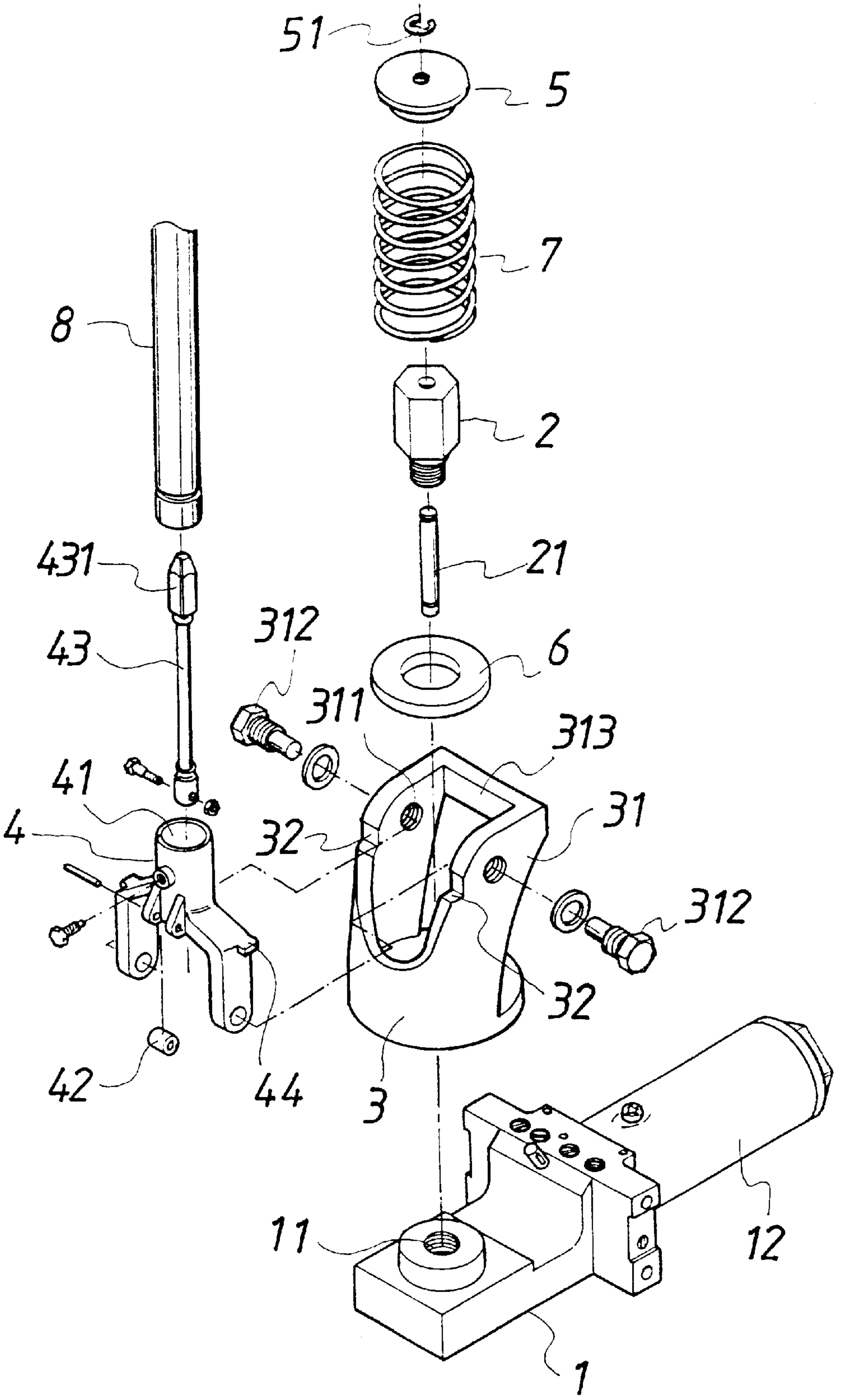
FIG. 2 is an exploded perspective view of the first embodiment in the present invention.

Referring to FIGS. 1 and 2, the first embodiment of a jack with a rotary handle sleeve of the present invention is illustrated. In the present invention. the base 1 of a jack is installed with a rotary supporting seat 3, handle sleeve 4, an upper washer 5, a lower washer 6, and a compressible spring 7.

The base 1 has an oil chamber 11 and related pipes, one side thereof being installed with a hydraulic cylinder 12.

The pump 2 is locked to the oil chamber 11 of the base 1 and has a piston 21 therein.

The rotary supporting seat 3 is a hollow seat and is installed at an upper end of the oil chamber 11 of the base 1. Two sides of the seat have respective supporting plates 31. Each supporting plate 31 is installed with a screw hole 311, thereby, it can be pivotally installed with the handle sleeve 4 by a set of studs 312.

The handle sleeve 4 is movably installed to the rotary supporting seat 3. The handle sleeve 4 can generate a pressing action between the two supporting plates 31 of the rotary supporting seat 3. The upper end of the handle sleeve 4 has an inserting hole 41 for being inserted by a tube 8, and one side thereof is combined with a movable roller 42.

The upper washer 5 is passed through by the piston 21 and is buckled to a C ring 51.

The lower washer 6 is locked between the rotary supporting seat 3 and the pump 2.

The compressible spring 7 is embedded between the upper washer 5 and the lower washer 6.

Figure 3:
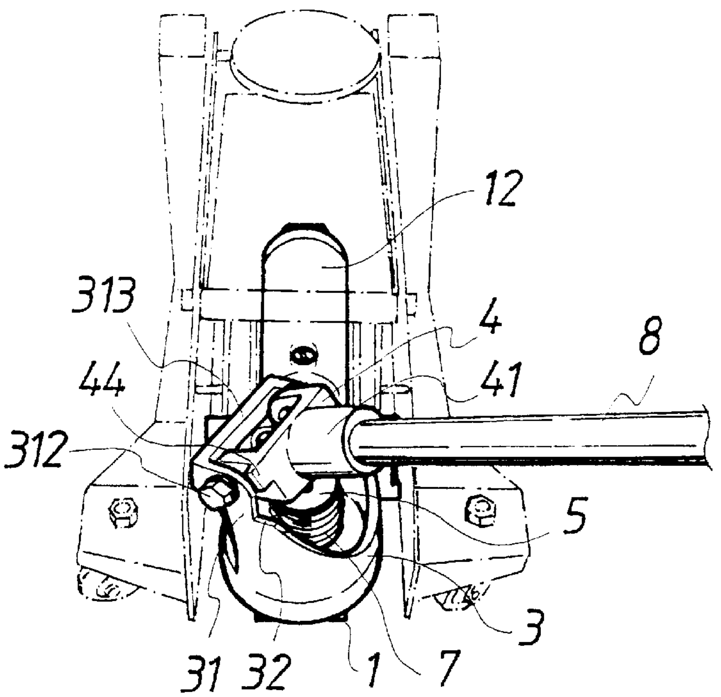
FIG. 3 is a schematic view showing the handle sleeve in the first embodiment of the present invention which rotates rightwards.
Figure 4:
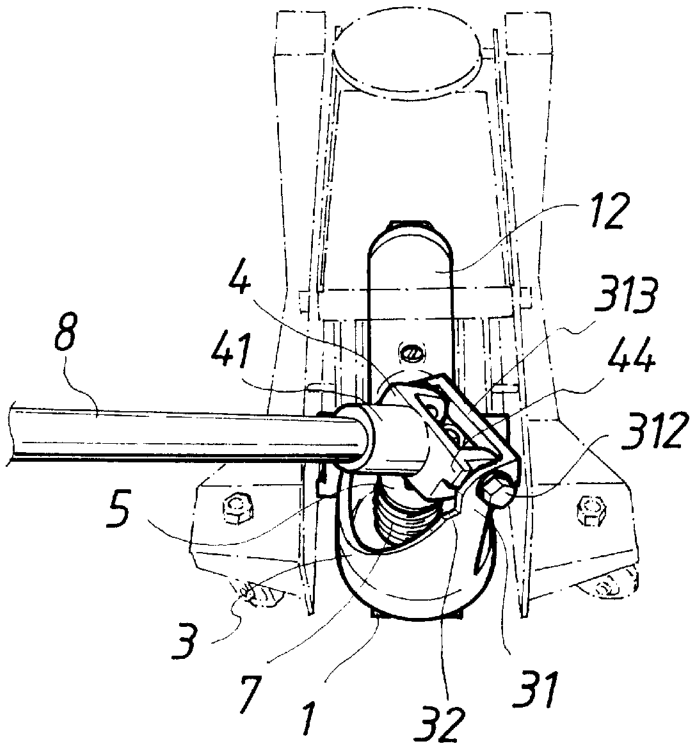
FIG. 4 is a schematic view showing the handle sleeve in the first embodiment of the present invention which rotates leftwards.

By above components, the handle sleeve 4 of the jack can be locked to the rotary supporting seat 3 so that the rotary supporting seat 3 passes through the lower washer 6 of the pump 2 so as to be locked to the base 1. Therefore, the handle sleeve 4 has the function of rotating rightwards and leftwards (referring to FIGS. 3 and 4)

In above handle sleeve 4, a flexible shaft 43 is locked to the inserting hole 41. The flexible shaft 43 penetrates through the handle sleeve 4. One end joint 431 properly protrudes from the inserting hole 4 1. Another end is connected with an oil return valve 10. The joint 431 of the flexible shaft 43 has a polygonal shape so as to be engaged with an inserting end of the tube 8 (referring to FIG. 3). Thereby, the oil return valve 10 is released or closed by the rotation of the tube 8.

In the present invention, in the rotary supporting seat 3, a connected stopping piece 313 is installed between the two supporting plates 31. Thereby, the handle sleeve 4 is locked behind the rotary supporting seat 3. Therefore, by the connected stopping piece 313, the handle sleeve 4 may have a stopping effect in the vertical direction so that the handle sleeve 4 is preferably positioned in the vertically direction. Thereby, the movable roller 42 is in contact with the piston 21 without separating from one another.

Moreover, referring to FIG. 2, the predetermined positions of the handle sleeve 4 and rotary supporting seat 3 are installed with an extending stopper 44 and a step-like stopping surface 32. After the handle sleeve 4 presses downwards, the stopper 44 resists against the stopping surface 32 of the rotary supporting seat 3, thereby, the lower limit being defined. As a result, the piston 21 of the pump is protected from being damaged due to an overlarge force. Similarly, configurations of the stopper 44 and the stopping surface 32 are selectable to have any desired shape which may provide a resisting effect therebetween.

Figure 5:
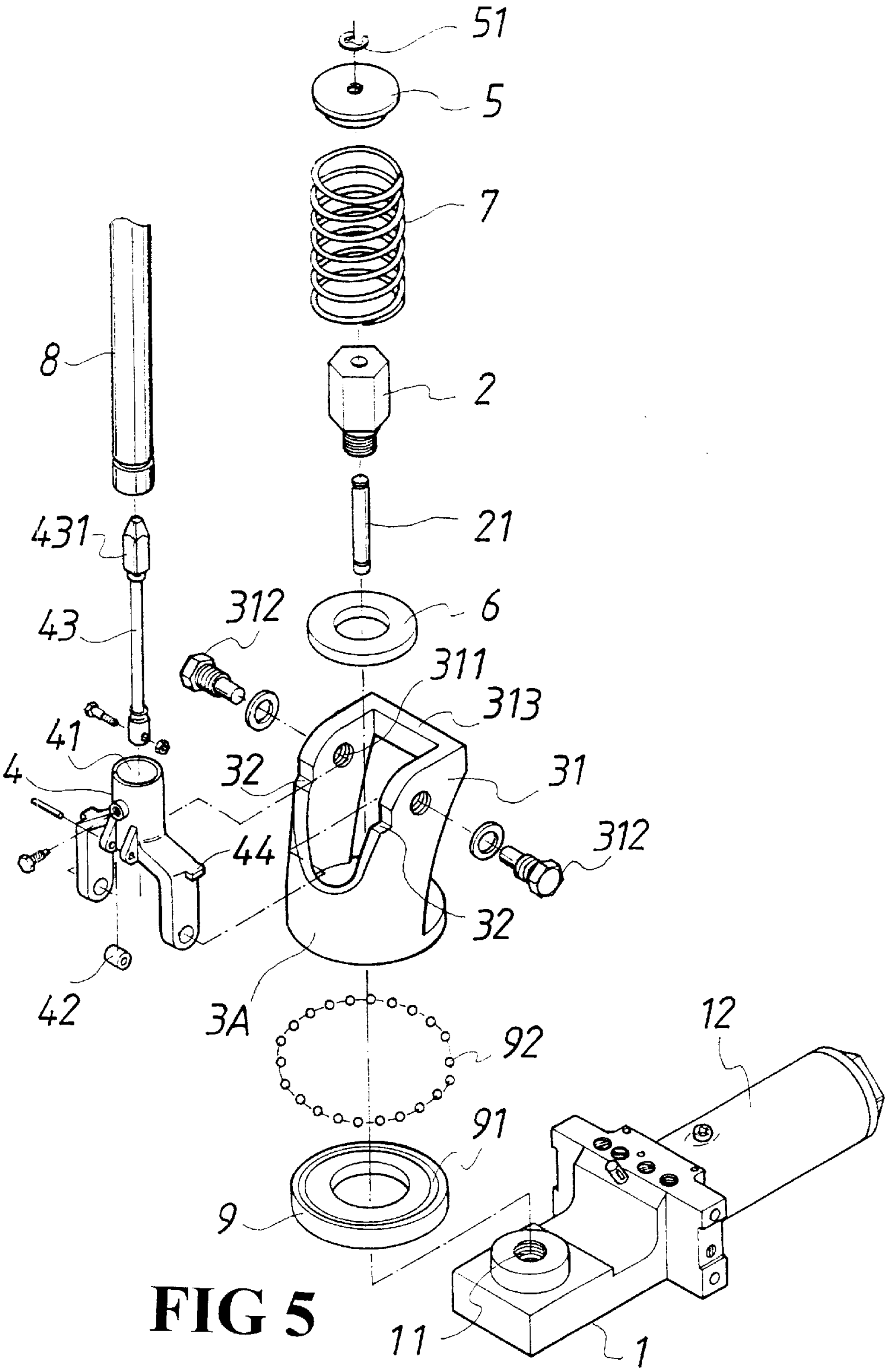
FIG. 5 is an exploded perspective view of the second embodiment in the present invention.
Figure 6:
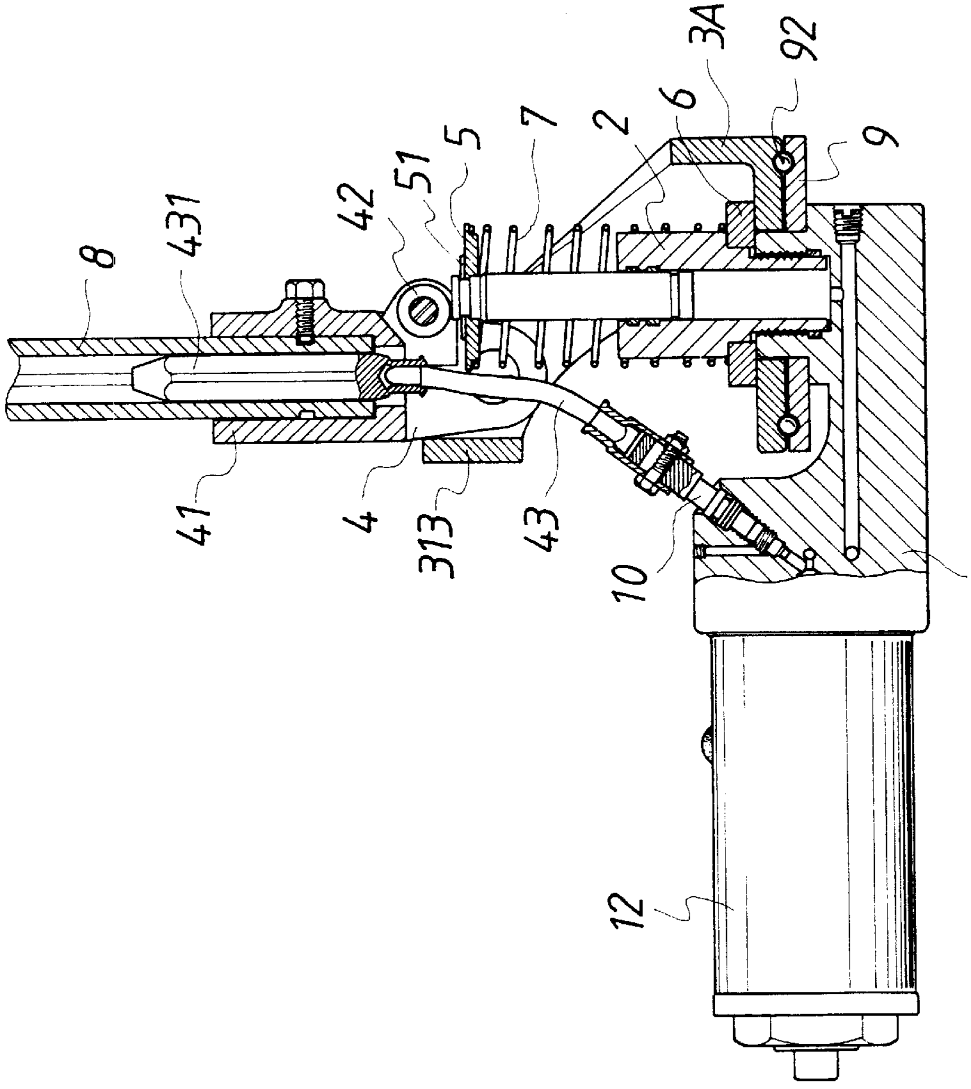
FIG. 6 is a schematic cross sectional view of the second embodiment in the handle sleeve has not been operated.
Figure 7:
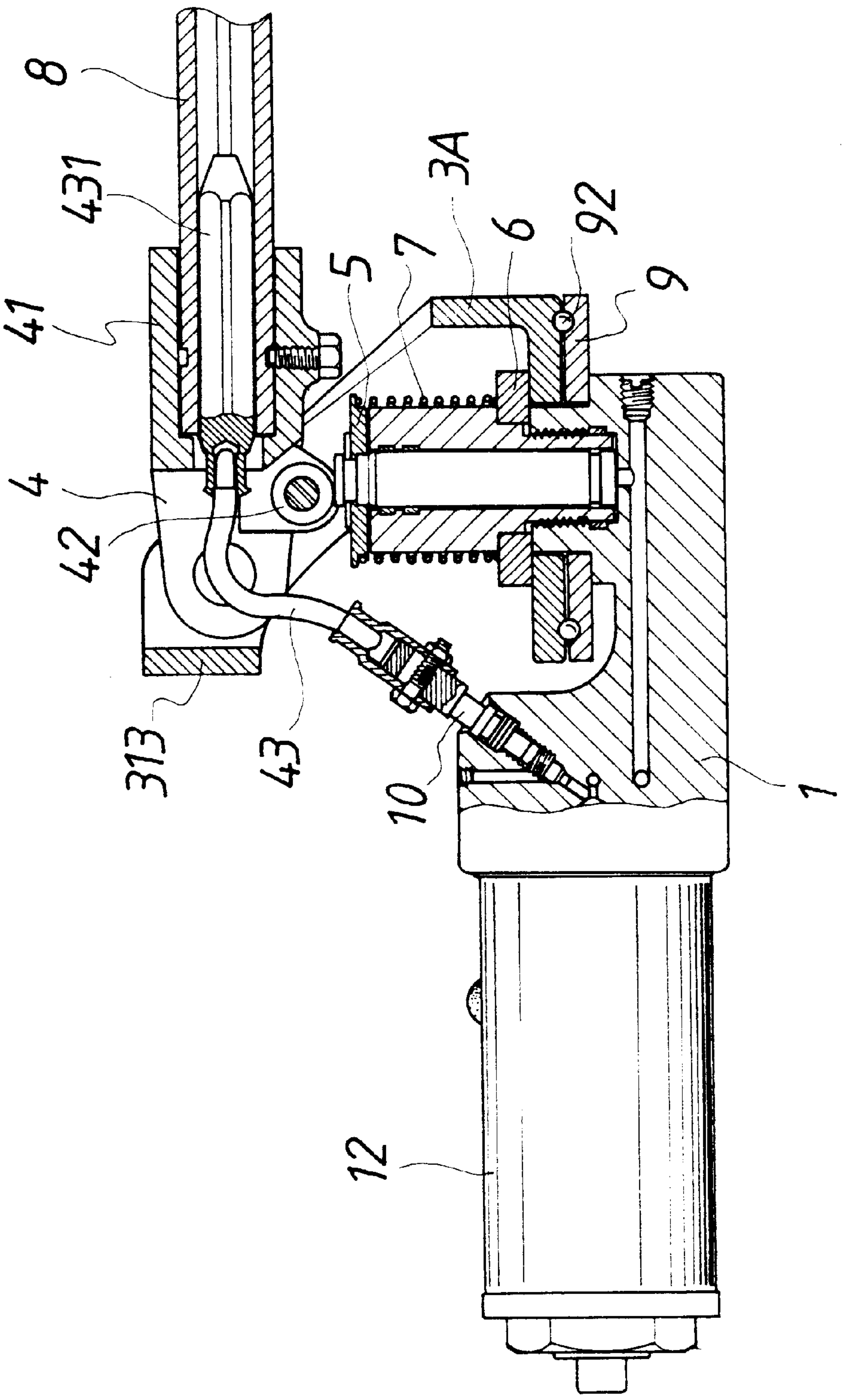
FIG. 7 is a schematic cross sectional view of the second embodiment of the present invention wherein the handle sleeve has been operated.

With reference to FIGS. 5 and 7, an assembled schematic view of the second embodiment of the present invention is illustrated. The structure in the second embodiment is approximately identical to that in the first embodiment except that a steel ball bearing 9 is provided between a rotary supporting seat 3A and a base 1 of jack. The steel ball bearing 9 is engaged with the oil chamber 11 of the base 1. The ball groove 91 at an end surface and the steel ball groove with respect to the bottom of the rotary supporting seat 3A may receive a plurality of steel balls 92 (referring to FIGS. 6 and 7), so that the handle sleeve 4 and the rotary supporting seat 3A may rotate more effectively.

Figure 8:
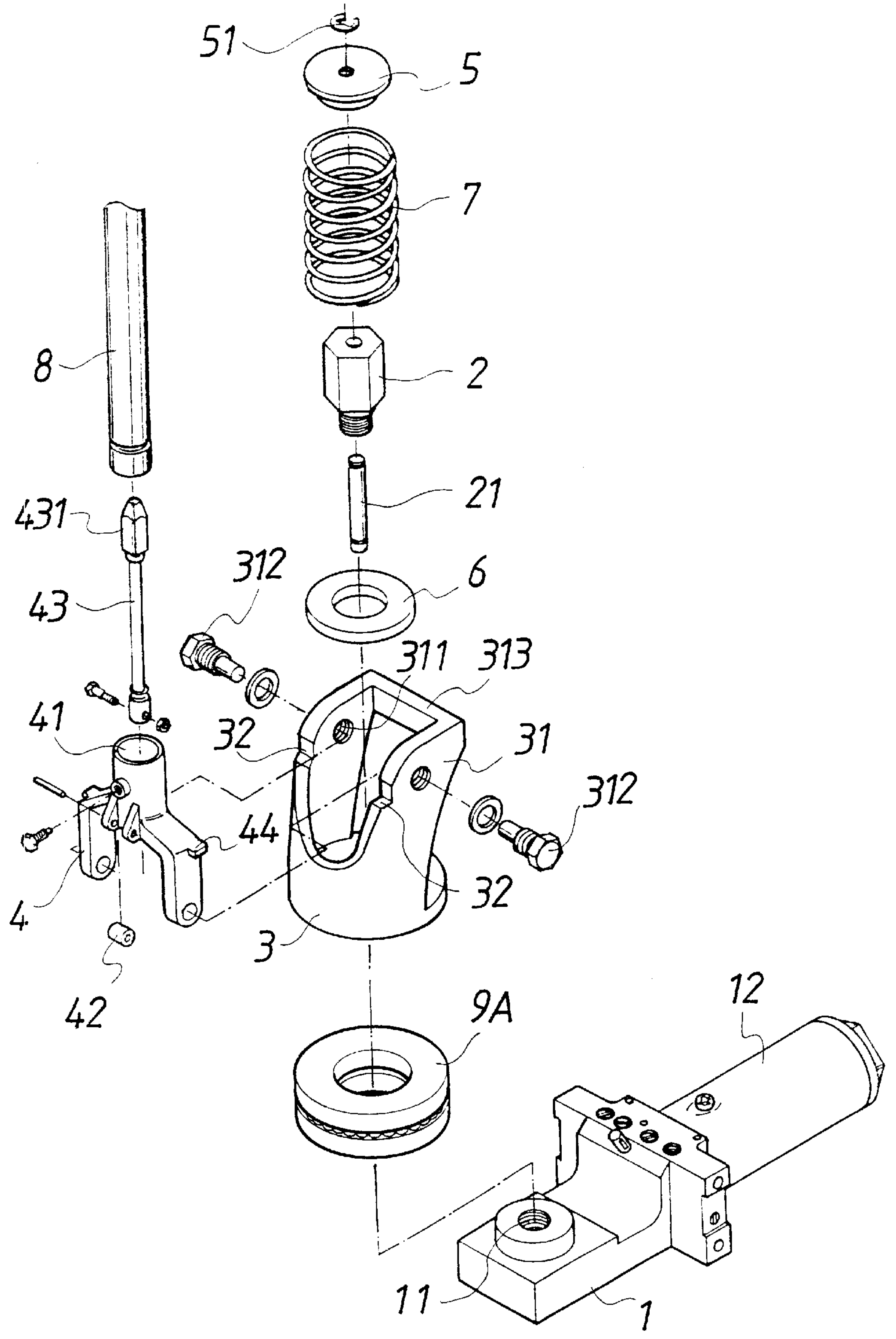
FIG. 8 is an exploded perspective view of the third embodiment in the present invention.
Figure 9:
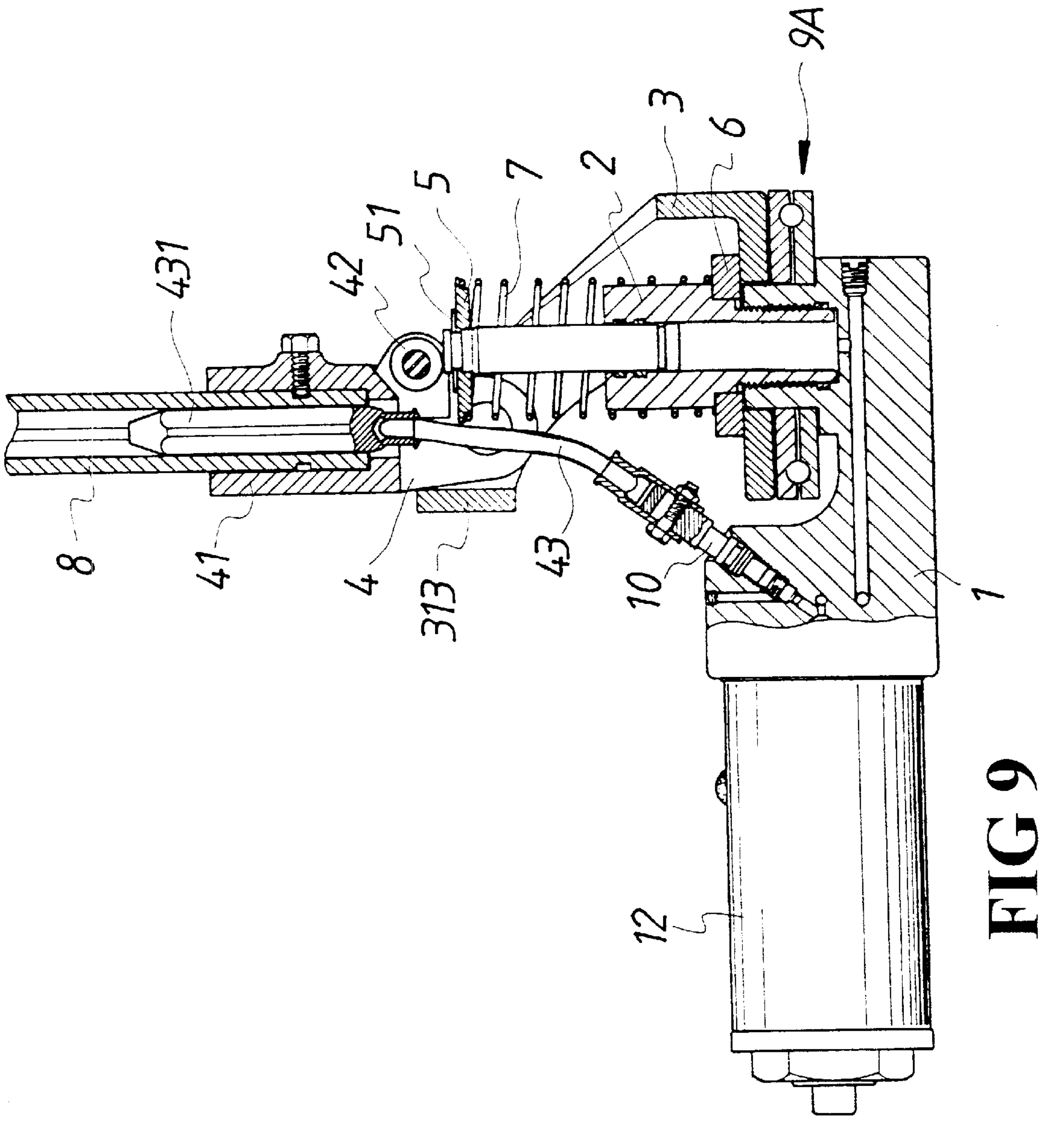
FIG. 9 is a schematic cross sectional view of the third embodiment of the present invention, where the handle sleeve is not operated.

Similarly, as shown in FIGS. 8 and 9, the assembled schematic view of the third embodiment of the present invention is illustrated. The related structure is identical to the first embodiment except that a thrust bearing 9A. By the thrust bearing 9A, the handle sleeve 4 and the rotary supporting seat 3A may rotate more effectively.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A jack with a rotary handle sleeve, which comprises a base having an oil chamber, a rotary supporting seat being installed at an upper end of the oil chamber of the base, a pump being arranged on and engaging the rotary supporting seat, the pump including a piston, an upper washer receiving the piston, a lower washer being locked between the rotary supporting seat and the pump, a compressible spring being arranged between the upper washer and the lower washer, a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, and one side of the handle sleeve including a movable roller;

wherein the handle sleeve of the jack is locked to the rotary supporting seat, so that the rotary supporting seat is firmly secured to the base of the jack and the handle sleeve can rotate rightwards and leftwards.

2. A jack with a rotary handle sleeve, which comprises a base having an oil chamber, a rotary supporting seat being installed at an upper end of the oil chamber of the base, a pump being arranged on and engaging the rotary supporting seat, and a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, one side of the handle sleeve including a movable roller; the handle sleeve further including a flexible shaft being locked into the inserting hole, the flexible shaft penetrating through the handle sleeve, and the flexible shaft having an end joint with one end protruding from the inserting hole and another end communicating with an oil return valve;

wherein the handle sleeve of the jack is locked to the rotary supporting seat, so that the rotary supporting seat is firmly secured to the base of the jack and the handle sleeve can rotate rightwards and leftwards.

3. A jack with a rotary handle sleeve, which comprises a base having an oil chamber, a rotary supporting seat being installed at an upper end of the oil chamber of the base, a pump being arranged on and engaging. the rotary supporting seat, and a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, the handle sleeve further comprising a flexible shaft having a polygonal shape for engaging an end of the tube and an end joint, the tube being arranged so that an oil return valve is released or closed by the rotation of the tube, and one side of the handle sleeve including a movable roller;

wherein the handle sleeve of the jack is locked to the rotary supporting seat, so that the rotary supporting seat is firmly secured to the base of the jack and the handle sleeve can rotate rightwards and leftwards.

4. A jack with a rotary handle sleeve, which comprises a base having an oil chamber, a rotary supporting seat being installed at an upper end of the oil chamber of the base, a pump being arranged on and engaging the rotary supporting seat, and a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, and one side of the handle sleeve including a movable roller, wherein the handle sleeve of the jack is locked to the rotary supporting seat, so that the rotary supporting seat is firmly secured to the base of the jack and the handle sleeve can rotate rightwards and leftwards, and wherein in the rotary supporting seat includes two supporting plates, a connected stopping piece installed between the two supporting plates; thereby, the handle sleeve is locked behind the rotary supporting seat so as to generate a vertical stopping effect.

5. A jack with a rotary handle sleeve, which comprises a base having an oil chamber, a rotary supporting seat being installed at an upper end of the oil chamber of the base, a pump being arranged on and engaging the rotary supporting seat, and a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, and one side of the handle sleeve including a movable roller; and an extending stopper being arranged on positions of the handle sleeve, and a stepped stopping surface being provided on the rotary supporting seat, the handle sleeve and a rotary supporting seat cooperating together so that when the handle sleeve presses downwards, the stopper resists against the stopping surface of the rotary supporting seat, thereby providing the handle sleeve with a lower limit;

wherein the handle sleeve of the jack is locked to the rotary supporting seat, so that the rotary supporting seat is firmly secured to the base of the jack and the handle sleeve can rotate rightwards and leftwards.

6. A jack with a rotary handle sleeve, which comprises a base having an oil chamber, a rotary supporting seat being installed at an upper end of the oil chamber of the base, a pump being arranged on and engaging the rotary supporting seat, and a handle sleeve being pivotally and movably installed on the rotary supporting seat, the handle sleeve generating a pressing action upon the rotary supporting seat, an upper end of the handle sleeve having an inserting hole, a tube being received in the inserting hole of the upper end of the handle sleeve, and one side of the handle sleeve including a movable roller, and a bearing being arranged between the rotary supporting seat and the base of the jack, the bearing engaging the oil chamber of the base, a surface of the bearing facing the rotary supporting seat having a ball groove, the ball groove receiving a plurality of steel balls for providing more efficient movement between the handle sleeve and the rotary supporting seat;

wherein the handle sleeve of the jack is locked to the rotary supporting seat, so that the rotary supporting seat is firmly secured to the base of the jack and the handle sleeve can rotate rightwards and leftwards.

* * * * *